E. H. AUSTIN.
Pipes for Gas, Water. &c.

No. 136,952.  Patented March 18, 1873.

Attest
Otis C. Tiffany
F. C. Bowen

Inventor
E. H. Austin
By VanSantvoord & Hauff
Attys.

UNITED STATES PATENT OFFICE.

ELIJAH H. AUSTIN, OF NEW YORK, N. Y.

IMPROVEMENT IN PIPES FOR GAS, WATER, &c.

Specification forming part of Letters Patent No. 136,952, dated March 18, 1873.

*To all whom it may concern:*

Be it known that I, ELIJAH HARRISON AUSTIN, of the city, county, and State of New York, have invented a new and useful Improvement in Pipes for Gas, Water, and other purposes; and I do hereby declare the following to be a full, clear, and exact description thereof, which will enable those skilled in the art to make and use the same, reference being had to the accompanying drawing forming part of this specification, in which drawing—

Figure 1:
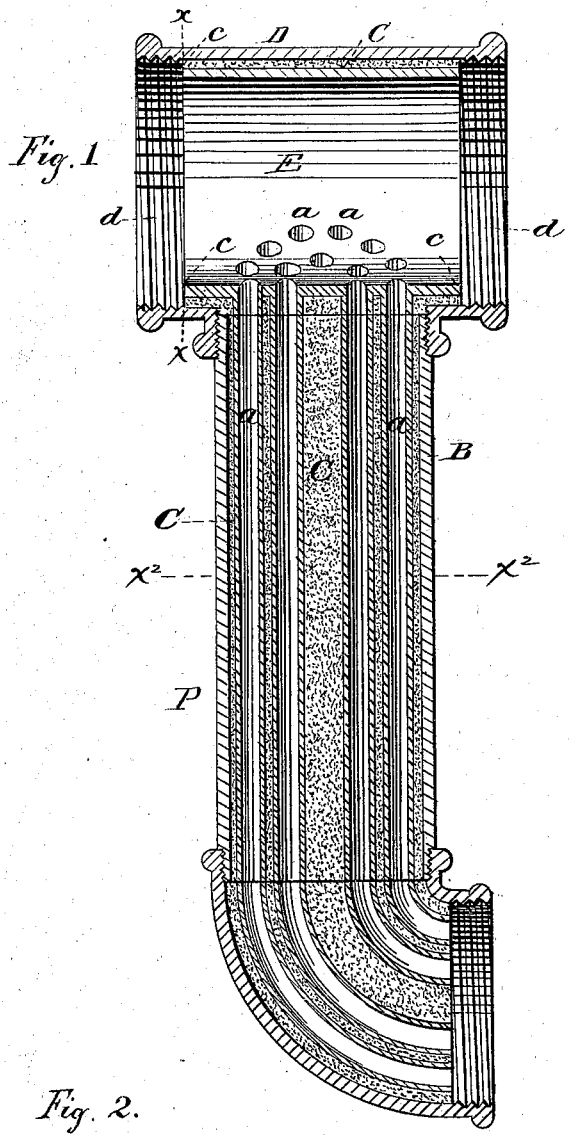
Figure 2:
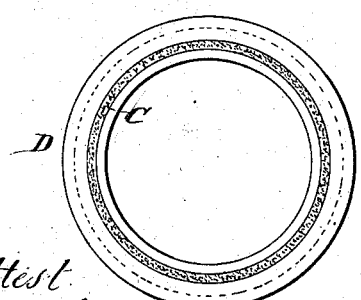
Figure 3:
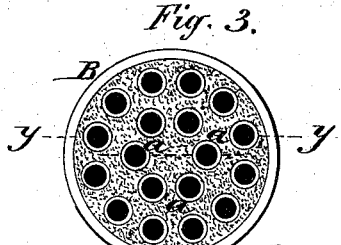

Figure 1 represents a central section of my invention on the line $y\ y$ of Fig. 3. Fig. 2 is a transverse section of a T-joint in the plane $x\ x$, Fig. 1. Fig. 3 is a transverse section, on line $x^2\ x^2$ of Fig. 1, of my improved pipe, when constructed with a multiplicity of passages in a common shell.

Similar letters indicate corresponding parts.

This invention relates to certain improvements on a pipe for gas, water, and other purposes, for which a patent was granted to me as assignee of William B. Guy, December 20, 1864, No. 45,491.

My present improvement consists in the arrangement of a series of passages in a common shell, each passage being lined with glass or other vitreous material, and separated from the other passages and from the shell by an intermediate layer of hydraulic cement, plaster Paris, bitumen, or other suitable material, in such a manner that a pipe is obtained which is of particular advantage for conducting a series of telegraph-wires under ground or under water, each passage being perfectly insulated from the remaining passages and from the surrounding solid or fluid substances.

In the drawing, the letter P designates my pipe, which consists of a series of pipes or tubes made of glass or other vitreous material, which are protected by the case B, made of metal, wood, or other suitable material, the spaces between the pipes or tubes and the outside case being filled with an intermediate layer, C, of plaster Paris, hydraulic cement, or other material of a suitable nature for this purpose.

In using this pipe for conducting telegraph-wires under ground or under water, I construct the same with a multiplicity of passages, $a$, as shown, each of the passages being lined with glass or other vitreous material, and separated from the remaining passages and from the shell B by intermediate layer C of cement or other suitable material.

By these means a conductor for telegraph-wires is obtained which provides for the passage of a large number of wires in a comparatively small space, while each wire is perfectly insulated from the remaining wires, from the shell of the pipe, and from the surrounding earth or water. A pipe with a number of passages, such as shown in Fig. 3, may, however, also be used for conducting different liquids or gases in a comparatively small space without allowing such liquids or gases to mix with each other or to come in contact with some material liable to contaminate the same. The case B forms a safe protection for the several pipes, and the intermediate layer or filling C prevents the vitreous lining of the several passages from being injured by expansion or contraction of the whole pipe in different temperatures.

The joints D, which serve to unite different sections of my pipe, are made of cast-iron or other suitable material, and they are provided with a lining, E, of glass or other vitreous material, which is separated from the metal by an intermediate layer, C, of cement or other suitable material. By the lining E and the intermediate layer C, shoulders $c\ c$ are formed close behind the screw-threads $d\ d$, which are cut into the ends of the joints for the reception of the pipes. The ends of the pipes, before being inserted into the joint, are ground off flat, and when the pipes are screwed into the joint their ends bear against the shoulders $c\ c$, so that the liquid or fluid passing through the pipes will not be permitted to come in contact with the metallic parts of the pipes or joints.

If desired, a suitable packing may be placed against the shoulders $c\ c$ to insure tight joints between them and the ends of the pipes.

The advantages of this pipe will be readily understood, since the glass, being not attacked by any of the known liquids or fluids, with only few exceptions, forms a safe conduct for such liquids or fluids; and, furthermore, the glass being a non-conductor of electricity, my pipes can be used with advantage for the protection of subterranean or submarine telegraph wires or cables.

What I claim as new, and desire to secure by Letters Patent, is—

A pipe, P, provided with a multiplicity of passages, each of which is lined with glass or other vitreous material, and separated from the remaining passages and from the shell B by an intermediate layer, C, of cement or other suitable material, substantially as shown and described.

This specification signed by me this 14th day of January, 1873.

ELIJAH HARRISON AUSTIN.

Witnesses:
W. HAUFF,
E. F. KASTENHUBER.